US006409289B2

(12) United States Patent
Wagner et al.

(10) Patent No.: US 6,409,289 B2
(45) Date of Patent: Jun. 25, 2002

(54) METHOD AND DEVICE FOR ENSURING THE BRAKING EFFECT OF BRAKE ACTUATORS IN A VEHICLE

(75) Inventors: Jochen Wagner, Moeglingen; Stefan Rychlak, Ilsede, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/867,119

(22) Filed: May 29, 2001

(30) Foreign Application Priority Data

May 29, 2000  (DE) .......................................... 100 264 01
Oct. 27, 2000  (DE) .......................................... 100 533 33

(51) Int. Cl.$^7$ ........................... B60T 17/22; B60T 8/00; B60T 8/92
(52) U.S. Cl. ........................................... 303/191; 303/1
(58) Field of Search ................................ 303/191, 199, 303/1, 145, 125, 2, 3, 15–20; 701/71, 75, 83; 180/197; 188/1.11 R, 151 A

(56) References Cited

U.S. PATENT DOCUMENTS 4,498,711 A  *  2/1985  Langley et al. ................. 303/1
5,570,937 A  *  11/1996  Wolfsried ................... 303/191

FOREIGN PATENT DOCUMENTS

DE  44 27 170  10/1995
DE  198 46 392  4/2000

OTHER PUBLICATIONS

"FDR—Die Fahrdynamikregelung von Bosch" (FDR—driving dynamics control by Bosch), ATZ, vol. 96, No. 11 (1994) pp. 674–689.*
SAE Paper 870337 "ASR traction control—a logical extension of ABS".*

* cited by examiner

Primary Examiner—Douglas C. Butler
(74) Attorney, Agent, or Firm—Kenyon & Kenyon

(57) ABSTRACT

A method of ensuring the braking effect of brake actuators in a vehicle is described, each brake actuator having first and second components for producing the braking effect, where films on the first components which would interfere with the deployment of the braking effect are removed. In this method, when an activation condition is met, the brake actuators are activated to remove the films so that the second components are applied to the first components, thereby setting the vehicle deceleration so that little or no deceleration is perceived by the driver. In checking on whether the activation condition is met, a quantity describing operation of the accelerator pedal is taken into account.

15 Claims, 3 Drawing Sheets

METHOD AND DEVICE FOR ENSURING THE BRAKING EFFECT OF BRAKE ACTUATORS IN A VEHICLE

FIELD OF THE INVENTION

The present invention relates to a method and a device for ensuring the braking effect of brake actuators in a vehicle. Many modifications of such methods and devices are known in the related art.

BACKGROUND INFORMATION

German Patent Application No. 198 46 392 describes a method of drying a vehicular operating brake having a brake disk and brake linings. The response of the operating brake when driving in rain or snow or on wet roads is improved by the methods described in German Patent Application No. 198 46 392, thus ensuring a shorter stopping distance. Information about the degree of wetness is generated first. On the basis of this information, an automatic drying function is activated, applying the brake linings to the brake disks in such a way that there is essentially no noticeable deceleration of the vehicle.

German Patent No. 44 27 170 describes a method of ensuring the braking effect of brakes in vehicles in wet weather. According to this method, a sensor device determines the presence of wetness. If there is wetness, the time when the brakes are not operated is determined. At least when the brake operation-free time thus determined exceeds a time threshold, a braking operation is performed by a controller provided in the vehicle during a certain braking time. During the braking operation, a brake pressure is generated, the resulting braking effect being determined so that the driver will not perceive any deceleration of the vehicle.

The publications cited above contain activation conditions which, when met, result in the brake actuators present in the vehicle being activated in such a way that braking-diminishing films on these brake actuators are removed. If none of these activation conditions are met, the operation of the gas pedal is considered.

Against this background, the object is as follows: Existing methods and equipment for ensuring the braking effect of brake actuators arranged in the vehicle are to be improved to the extent that the driver's desire for acceleration can be implemented without being affected.

At this point, reference should be made to the publication "FDR—Die Fahrdynamikregelung von Bosch" [FDR—driving dynamics control by Bosch] in the automotive engineering journal ATZ, vol. 96, no. 11 (1994) pp. 674–689. This publication describes a device for controlling the yaw rate of the vehicle. To do so, the measured yaw rate is compared with a setpoint for the yaw rate. This comparison determines a system deviation of the yaw rate as a function of which braking measures and/or engine measures are implemented on individual wheels independently of the driver. A yaw moment is applied to the vehicle mainly as a result of the braking measures independent of the driver, causing the actual yaw rate to approach the setpoint.

Furthermore, reference is made to SAE Paper 870337 "ASR traction control—a logical extension of ABS." This SAE paper describes a slip-regulated brake system with which traction control, in addition to brake slip control, can be implemented. Braking measures independent of the driver are also necessary to implement traction control.

The term "braking measures independent of the driver" as used above means that a brake pressure can be generated in the wheel brake cylinders with braking measures independently of the driver even if the driver has not operated the brake pedal. With these braking measures it is also possible to produce a higher brake pressure in the wheel brake cylinders than the admission pressure which is determined by operation of the brake pedal by the driver. To implement braking measures independently of the driver, there must be a pump in the brake system where a brake pressure can be produced independently of the driver.

The content of the publication cited above publication "FDR—Die Fahrdynamikregelung von Bosch" [FDR—driving dynamics control by Bosch] as well as the content of SAE Paper 870337 are hereby incorporated by reference in the present application.

SUMMARY OF THE INVENTION

The present method relates to a method of ensuring the braking effect of brake actuators in a vehicle, each brake actuator containing first and second components for producing the braking effect. With the present method, films on the first components that could interfere with the deployment of the braking effect are removed. To do so, when an activation condition is met, the brake actuators for removing the brake films are controlled in such a way that the second components are applied to the first components, so that there is little or no slowing of the vehicle that could be perceived by the driver.

According to the present invention, a quantity describing the operation of the accelerator pedal is taken into account in the present method in checking on whether the activation condition has been met. The activation condition has been met if the quantity describing the operation of the accelerator pedal indicates that the accelerator pedal has not been operated. This measure ensures that the driver's desire for acceleration is implemented without being affected. In other words, If the accelerator pedal has been operated, i.e., if the driver intends to accelerate, then in this situation the brake actuators are not activated to remove the films. Consequently, the driver's intent to accelerate can be implemented without being affected.

In addition to the quantity describing the operation of the accelerator pedal, additional quantities are also analyzed as part of the activation condition. First, quantities related to operation of the brake actuators are analyzed. One of these quantities describes the operation of the brake pedal, i.e., whether the driver is operating the brake pedal and thus braking measures depending on the driver are being implemented.

Another of these quantities represents operation of the brake actuators independently of the driver. In other words, this quantity indicates whether braking measures are being implemented independently of the driver, as is the case, for example, as part of a yaw rate regulator described in the publication cited above "FDR—Die Fahrdynamikregelung von Bosch" [FDR—driving dynamics control by Bosch] or as part of the traction control described in SAE Paper 870337 cited above. Therefore, the two quantities indicated above are analyzed as part of the activation condition, because it is not necessary to remove the films at the moment when the brake actuators are being operated, whether by the driver or independently of the driver.

Furthermore, a velocity quantity describing the velocity of the vehicle is analyzed. This is done for the following reason. At low velocities, it is much less problematic if the full braking effect is not available from the beginning than at high velocities.

In addition, a quantity representing the operation of the windshield wiper or a sensor for detecting wetness is analyzed. This is done because it is not usually necessary to remove the films until there is wetness.

In summary, the activation condition is met and thus it is necessary to remove the films when:
- the quantity describing operation of the accelerator pedal indicates that the accelerator pedal is not being operated, and/or
- a quantity describing operation of the brake pedal indicates that the brake pedal is not being operated, and/or
- a velocity quantity describing the velocity of the vehicle is greater than a respective threshold value, and/or
- a quantity representing operation of the brake actuators independently of the driver indicates that there is operation of the brake actuators independently of the driver, and/or
- a quantity representing operation of the windshield wiper indicates that the windshield wiper is being operated, or if a sensor for detecting wetness indicates that there is wetness.

The activation condition is usually met when all the individual conditions listed above are met at the same time. However, this should not be a restriction. It is also conceivable for the activation condition to be met even if only some of these individual conditions are met. For example, the windshield wiper need not necessarily be in operation or a sensor for detecting wetness need not be indicating the presence of wetness. This individual condition may also be disregarded. Finally, it is also conceivable for not only the films caused by wetness but also films or deposits in general to be removed by the method according to the present invention. In this case, removal of films would not be possible under dry road conditions if this individual condition were retained.

It has proven advantageous that a temperature quantity describing the outside temperature is analyzed as part of the activation condition. In this case, the activation condition is met when the temperature quantity is also lower than a predetermined temperature value. The outside temperature is taken into account as part of the activation condition, because driving on road surfaces in winter or when wet and salty represents a special problem. Driving on a road in winter or when wet and salty can be detected by simultaneous analysis of the outside temperature and operation of the windshield wiper or a sensor for detecting wetness. If the method according to the present invention is used exclusively for removing films due to driving on road surfaces in winter or when wet and salty, in this case, from the standpoint of the activation condition, it would be sufficient to analyze the individual conditions with respect to the outside temperature and operation of the windshield wiper or the sensor for detecting wetness.

It has proven advantageous if to remove the films the brake actuators are not activated so that a predetermined brake pressure is set directly by the control action, but instead, the brake actuators are activated as part of a vehicle control system.

To be able to set the brake pressure at a predetermined level, i.e., to regulate the brake pressure, the actual prevailing pressure must be available so that the actual pressure can be made to approach the setpoint pressure through the control operation. However, this poses a problem. Although slip-controlled brake systems such as those described in the ATZ article or SAE paper cited above usually have means with which the actual pressure can be estimated, the pressure values thus estimated cannot be used for the present application.

The brake pressures to be set according to the present invention to remove the films are on the order of magnitude of approximately five bar. In this pressure range, the estimate of the actual pressure is not very accurate. Consequently, this can result in a buildup of a higher brake pressure through brake pressure control than actually desired, because, for example, there is no system deviation, although one is indicated. Ultimately, this excessively high brake pressure which has been set incorrectly would result in the driver perceiving the removal of the films because of the resulting slowing of the vehicle.

However, removal of the films should be a comfort function which should take place unnoticed by the driver. Against this background, as mentioned above, a brake pressure should not be directly set by preselecting a setpoint pressure, i.e., regulating the brake pressure. Preselection of a setpoint pressure is therefore critical. In the case of an incorrect estimate, not only may the brake pressure be set too high, but there may not be any pressure buildup at all.

It has proven advantageous to regulate not the brake pressure but instead the deceleration of the vehicle as a means of removing the films. In other words, the brake pressure necessary to remove the films is not set directly, but instead is set indirectly by regulating the deceleration of the vehicle. Deceleration of a vehicle is generally regulated as follows. A setpoint for the vehicle deceleration is selected. A system deviation is determined by comparing the actual value determined for the vehicle deceleration with the setpoint. The brake actuators are controlled as a function of this system deviation so that the actual value of the vehicle deceleration approaches the setpoint. If the absolute value of the setpoint is greater than that of the actual value, the brake actuators are controlled so that brake pressure is supplied to the wheel brake cylinder. However, if the absolute value of the setpoint is lower than the absolute value of the actual value, the brake actuators are controlled so that brake pressure in the wheel brake cylinders is reduced. Controlling vehicle deceleration has the advantage that this control is very accurate, because the actual value for the vehicle deceleration can be determined very accurately as a function of the wheel speeds determined.

The activation condition indicates that removal of the films is necessary, and therefore the brake actuators must be activated as part of controlling vehicle deceleration, so the setpoint for the vehicle deceleration is determined in an advantageous manner as soon as the activation condition is met. Thus, as soon as the activation condition has been met, vehicle deceleration control can be implemented. As indicated above, vehicle deceleration is controlled at least by operation of the brake actuators as a function of the setpoint. Due to this operation of the brake actuators, the films on the first components of the brake actuators are removed. To summarize, the present method ensures that sufficient pressure is created in the wheels and that the driver will hardly notice any impairment at all in driving performance.

As mentioned above, one option is to determine a deceleration quantity which describes the deceleration of the vehicle and is necessary to control the vehicle deceleration, as a function of wheel speed quantities. This is suggested because the above-mentioned slip-controlled brake systems have wheel rpm sensors assigned to the vehicle wheels, i.e., no additional sensors are necessary.

As mentioned above, operation of the accelerator pedal is analyzed as part of the activation condition, i.e., the activation condition is met if there is at least no operation of the accelerator pedal. First, this ensures, as mentioned previously, that the driver's intent to accelerate is implemented without being hindered, because the films are not removed if the accelerator pedal is being operated.

However, there is also a second reason for taking into account the operation of the accelerator pedal. The activation condition is met if there is at least no operation of the accelerator pedal. In other words, in order for the activation condition to be met, the driver must have let off on the accelerator pedal. Since the accelerator pedal has been released, the engine no longer delivers any driving torque. Instead of this, it produces a drag moment which results in deceleration of the vehicle. Since the setpoint for the vehicle deceleration is determined as soon as the activation condition is met, i.e., at the start of the deceleration process initiated on the basis of the drag moment produced by the engine, the deceleration induced when the driver releases the accelerator pedal is used to remove the films, i.e., it is not necessary to "artificially" induce deceleration which the driver might perceive as uncomfortable. Consequently, the setpoint for vehicle deceleration is determined in an advantageous manner as a function of the value of the deceleration quantity prevailing at the time when the activation condition is met. However, to implement the operation of the brake actuators necessary for removing the films, an offset must also be taken into account in determining the setpoint.

This should take place in such a form that the absolute value of the setpoint is greater than the absolute amount of the value of the deceleration quantity prevailing at the time when the activation condition is met. If the setpoint is defined as a positive quantity, then the offset is also positive. However, if the setpoint is defined as a negative quantity, the offset is also negative.

To summarize, the setpoint deceleration is supplied at the beginning of the activation and is formed as a function of the instantaneous vehicle deceleration at that time plus an extra deceleration factor. Since slip-controlled brake systems have wheel rpm sensors, the setpoint deceleration is derived directly from measured quantities and thus can be determined reliably. The vehicle deceleration is influenced in a defined manner by preselecting a setpoint deceleration and thus can be controlled precisely. The desired brake pressure buildup which is necessary for removal of the films takes place according to the extra deceleration factor. The offset can be supplied in various ways. The offset is advantageously a fixedly predetermined value which is applied in advance via analysis of preliminary driving trials. However, the offset may also be a value obtained with a predetermined factor by weighting the value of the deceleration quantity prevailing at the time when the activation condition is met. This predetermined factor is also applied in advance in preliminary driving trials.

The following procedure has proven advantageous in checking the activation condition. The activation condition is composed of individual conditions, as mentioned previously. For successive points in time, at least one individual condition is checked. In other words, a check is performed for each of the successive points in time to determine whether at least one of the individual conditions is met at this time. There is an essentially uniform predetermined interval between the successive points in time, i.e., the successive points in time form a time grid having predetermined intervals. This interval is applied in advance through preliminary driving trials. Computing capacity of the controller is not tied up unnecessarily because of this analysis of the activation condition taking place in a time grid.

The interval of the time grid is selected so that removal of the films can be performed if necessary, i.e., if experience has shown that a film has again formed on the first components of the brake actuators. The determination of the interval is based on experience obtained through driving trials. The interval is preferably on the order of five to ten minutes.

The procedure of checking whether the activation conditions have been met at certain points in time can be interpreted as an activation request being supplied at certain points in time and different individual conditions are checked if this activation request is present. The activation condition is met as soon as at least one of these individual conditions is met when there is an activation request.

The successive points in time normally have a predetermined interval between them. However, this interval could be influenced in two cases. First, the sequence of the successive points in time and thus the activation request can be reset by successful removal of the films or by operation of the brake actuators either by the driver or independently of the driver. This means that as soon as the films have been removed or after operation of the brake actuators either by the driver or independently of the driver, the next point in time follows directly. This point in time thus does not have the predetermined interval from the directly preceding point in time. The time grid is more or less shifted. The following points in time again have the predetermined interval.

This takes place against the background that after removal of the films or after operation of the brake actuators either by the driver or independently of the driver, the films are removed and a new deceleration of the first components is necessary again only after the predetermined interval.

The procedure described above can be summarized as follows. If the brake actuators are operated either by the driver or independently of the driver or if the brake actuators are activated, in particular to remove the films, between two successive points in time, then at least the next point in time is selected as a function of this operation or activation. It is provided in particular here that the following points in time are based on this operation or activation.

In an advantageous embodiment, when the brake actuators are operated either by the driver or independently of the driver or when the brake actuators are activated between two successive points in time, in particular to remove the films, the next point in time follows directly or indirectly after successful operation or activation and the following points in time are based on this operation or activation.

In addition, the preset interval may be adapted to the prevailing boundary conditions. In the present case, for example, these should be defined by the outside temperature and/or the intensity of the wetness. The preset interval is advantageously modified as a function of a temperature quantity describing the outside temperature in such a way that this interval is smaller at lower temperatures than at high temperatures. In addition, the preset interval is modified as a function of a quantity describing operation of the windshield wiper in such a way that the interval becomes smaller with increasing windshield wiper speed. As an alternative or in addition to the analysis of operation of the windshield wiper, a rain sensor which is optionally present in the vehicle may be analyzed. In general form, a sensor for detecting wetness on the road surface may be analyzed.

If the activation condition is met, the brake actuators are generally activated on all wheels of the vehicle to remove the films. This activation of the brake actuators may also take place only for some of the vehicle wheels to advantage. Since the braking effect on the front axle is greater than that on the rear axle in a braking operation, it is advantageous if at least the brake actuators on the front axle of the vehicle are operated, so at least the films are removed from the wheels on the front axle.

Activation of the brake actuators to remove the films on the first components is terminated when a deactivation condition is met. Various individual conditions are analyzed as part of the deactivation condition. For example, the period of time during which the brake actuators are controlled to remove the films and/or operation of the accelerator pedal and/or operation of the brake pedal and/or the velocity quantity and/or a quantity representing operation of the brake actuators independently of the driver is analyzed.

The deactivation condition is met when:
- the period of time during which the brake actuators are activated to remove the films is greater than a preset time value, and/or
- the quantity describing operation of the accelerator pedal indicates that the accelerator pedal is being operated, and/or
- a quantity describing operation of the brake pedal indicates that the brake pedal is being operated, and/or
- a velocity quantity describing the velocity of the vehicle is below a respective threshold value, and/or
- a quantity representing operation of the brake actuators independently of the driver indicates that the brake actuators are being operated independently of the driver.

The brake actuators may be designed as disk brakes or as drum brakes. If the brake actuators are disk brakes, they have brake disks as the first components and brake linings as the second components. If the brake actuators are drum brakes, they have a brake drum as the first component and brake shoes as the second component.

With the method according to the present invention, the operability of the wheel brakes should be maintained even under unfavorable conditions, e.g., in winter, on icy roads or when driving for a long time without operation of the brakes.

DETAILED DESCRIPTION

Figure 1:
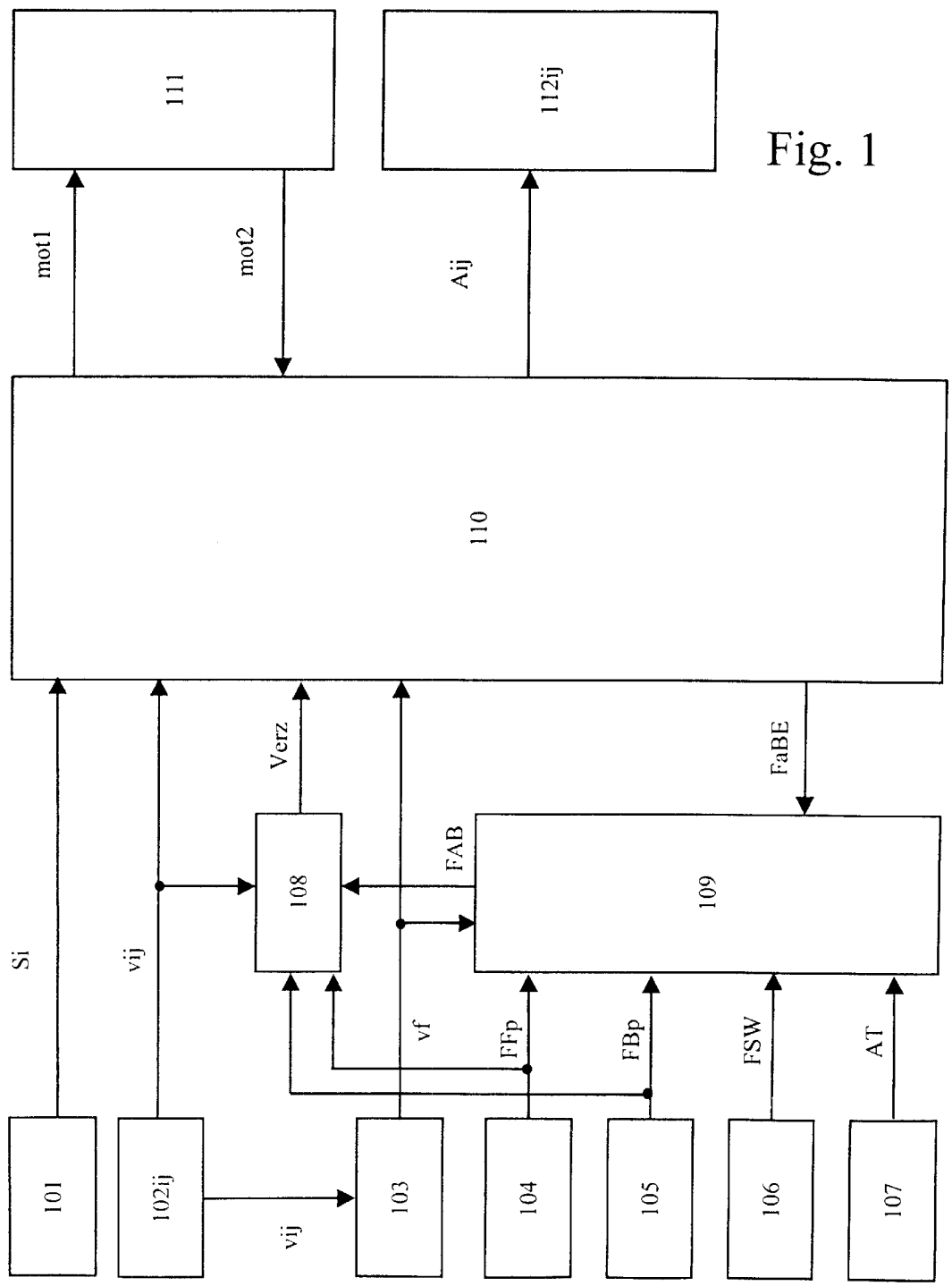
FIG. 1 illustrates the device according to the present invention in a block diagram.

FIG. 1 shows controller means 110 in a general form. These controller means may be, for example, of the type used as part of driving dynamics control (ESP) for regulating the yaw rate of the vehicle. With regard to more extensive details, reference is made to the publication "FDR—Die Fahrdynamikregelung von Bosch" [FDR— driving dynamics control by Bosch] cited above.

Various input quantities are sent to controller means 110 as part of the driving dynamics control. These input quantities include the transverse acceleration of the vehicle, the steering angle set by the driver, the yaw rate of the vehicle and the admission pressure set by the driver. The individual sensors required for this are combined in a block 101. The signals or quantities Si detected with these individual sensors are sent to controller means 110. The individual sensors include a transverse acceleration sensor, a steering angle sensor, a yaw rate sensor and an admission pressure sensor.

As an alternative to the sensors described above, some of these sensors may also be replaced by tire force sensors. Tire force sensors operate according to the following principle. Magnetic powder magnetized alternately in north and south poles is incorporated into the inner side wall of the tire. Two sensors mounted on the spring leg—one near the tread, the second near the rim—register any relative shifting of the magnetic fields. This shifting occurs with acceleration, braking or turning. The forces between the tires and the road surface can be calculated from the deformation of the tires. Vehicle quantities such as transverse acceleration and yaw rate can then be calculated from these forces.

In addition, wheel speed quantities vij are supplied individually with the help of a block $102ij$ in driving dynamics control, and a velocity quantity vf describing the velocity of the vehicle is needed. Wheel speed quantities vij are sent from block 102 to block 110. The abbreviated notation is explained as follows in the case of vij or $102ij$: index i indicates a front wheel (v) or a rear wheel (h), and index j indicates a right (r) or a left (l) vehicle wheel. This notation is the same for all the quantities or blocks for which it is used. Velocity quantity vf is determined in block 103 in a known manner on the basis of wheel speed quantities vij sent from block $102ij$. Velocity quantity vf is sent to block 110 for further processing as part of the driving dynamics control.

As an alternative, controller means 110 may also be those used as part of traction control such as that described in the SAE paper cited above. Traction control usually requires only wheel speed quantities vij and a velocity quantity vf as input quantities. In other words, block 101 may be omitted in this case because no other input quantities are needed in addition to the wheel speed quantity and the velocity quantity.

Based on the input quantities supplied by controller means 110, i.e., quantities si, vij and vf in the case of driving dynamics control, and quantities vij and vf in the case of traction control, controller means 110 generate control signals according to the control concept embodied there. First, these are control signals mot1 with which the torque generated by engine 111 is adjusted. Thereby the drive torque transmitted to the driven wheels is reduced if necessary. Second, these are control signals aij for activating brake actuators $112ij$. In the case of traction control, a braking torque acting on the driving wheels is built up due to this activation of the brake actuators. In the case of driving dynamics control, braking measures for individual wheels are implemented by controlling the brake actuators, leading to a yaw moment acting on the vehicle. Due to this yaw moment, the actual yaw rate is influenced according to the setpoint yaw rate. Activation of the brake actuators as described above as a function of control signals aij is activation of the brake actuators independently of the driver. Brake actuators $112ij$ may be part of a hydraulic, electrohydraulic, pneumatic, electropneumatic or electromechanical brake system. Usually no activation signals are necessary for implementation of operation of the brake actuators depending on the driver. In a hydraulic brake system, for example, the brake actuators are designed so that the brake pressure set by the driver by operating the brake pedal enters directly into the brake actuators.

A quantity mot2, which is sent to controller means 110 in conjunction with the torque delivered by the engine, supplies information to the controller means regarding the instantaneous engine torque.

With the aim of removing the films from the first components of the brake actuators, two things are performed in block 109. First, a check is performed in block 109 to determine whether an activation condition is met. If the activation condition is met, a value of 1 is assigned to quantity FAB. If the activation condition is not met, a value of 0 is assigned to quantity FAB. Second, a check is performed in block 109 to determine whether a deactivation condition is met. For the case when quantity FAB is assigned a value of 1, quantity FAB is reset if the deactivation condition is met, i.e., quantity FAB is assigned a value of 0. Quantity FAB is sent from a block 109 to a block 108. The check of the activation condition or the deactivation condition is described in detail in conjunction with steps 202 and 204 in FIG. 2. At this point, only the different quantities sent to block 109 in this connection are to be explained.

These are the following quantities:

Velocity quantity vt which is determined in block 103.

A quantity FFp which describes the operation of the accelerator pedal and is determined in a block 104. This block 104 may be, for example, a switch which is assigned to the accelerator pedal and is activated by the driver by operating the accelerator pedal. For example, quantity FFp should have a value of 1 if the accelerator pedal is operated but otherwise it should have a value of 0.

A quantity FBp which describes operation of the brake pedal and is determined in a block 105. Block 105 may be, for example, a brake light switch. Quantity FBp should have a value of 1 if the brake pedal is operated and otherwise it should have a value of 0.

A quantity FSW which is generated in block 106 and represents operation of the windshield wiper. For example, quantity FSW should have a value of 0 for the case when the windshield wiper is not being operated. If the windshield wiper is being operated, quantity FSW should have a value representing the windshield wiper speed. In this case, block 106 is a means for reflecting the position of the operating lever of the windshield wiper.

As an alternative, block 106 may also be a sensor for detecting wetness on the road surface. Accordingly, quantity FSW is a measure of the wetness detected in this case.

A temperature quantity at describing the outside temperature. Temperature quantity at is generated in a block 107, e.g., from an independent outside temperature sensor or a sensor integrated into an air conditioner.

A quantity FABE which represents the operation of the brake actuators independently of the driver. This quantity is generated in controller means 110.

The result of the check of the activation condition and the deactivation condition is sent to block 108. Block 108 is a controller for vehicle deceleration.

As part of the vehicle deceleration control, wheel speed quantities vij and quantities FFp and FBp are sent to block 108. In vehicle deceleration control, an actual value for the vehicle deceleration is adjusted to a setpoint for vehicle deceleration by operation of the brake actuators. The setpoint for the vehicle deceleration is determined as soon as the activation condition is met. The setpoint for vehicle deceleration is determined as a function of the value of the deceleration prevailing at the time when the activation condition is met, and an offset is also determined in such a way that the absolute value of the setpoint is greater than the absolute value of the deceleration quantity. In other words, the value of the deceleration quantity which describes the vehicle deceleration and is not determined in block 108 as a function of wheel speed quantities vij at the time when the activation condition is met is more or less frozen and is modified with the help of the offset so that the absolute value of the resulting setpoint is increased in comparison with the frozen value.

As part of the vehicle deceleration control, the actual value for the vehicle deceleration, i.e., the prevailing deceleration quantity, is compared with the setpoint. The result of this comparison is sent to controller means 110 through quantity verz. The following allocation may hold: to set the actual value at the setpoint, the braking force and thus also the brake pressure is either increased or decreased as a function of the sign of quantity verz. The absolute value of quantity verz indicates the extent to which this must be done, i.e., how much the braking force must be adjusted. If quantity verz has a value of 0, either operation of the brake actuators is not necessary because the actual value for the vehicle deceleration matches the setpoint, or there is no vehicle deceleration control, i.e., deceleration controller 108 is turned off.

If the activation condition is met, quantity FAB supplied to block 108 has a value of 1. In this case, the setpoint for controlling the vehicle deceleration is determined first and then the control is implemented and thus the film on the first components of the brake actuators is removed. If the deactivation condition is met, quantity FAB is again assigned a value of 0. In this case, either the removal of the films is terminated or it must be interrupted. Consequently, vehicle deceleration control is terminated or the deceleration controller is turned off and quantity verz is assigned a value of 0.

Quantity verz is sent to controller means 110, where it is converted to control signals aij for operation of brake actuators 112ij to remove the films.

Figure 2:
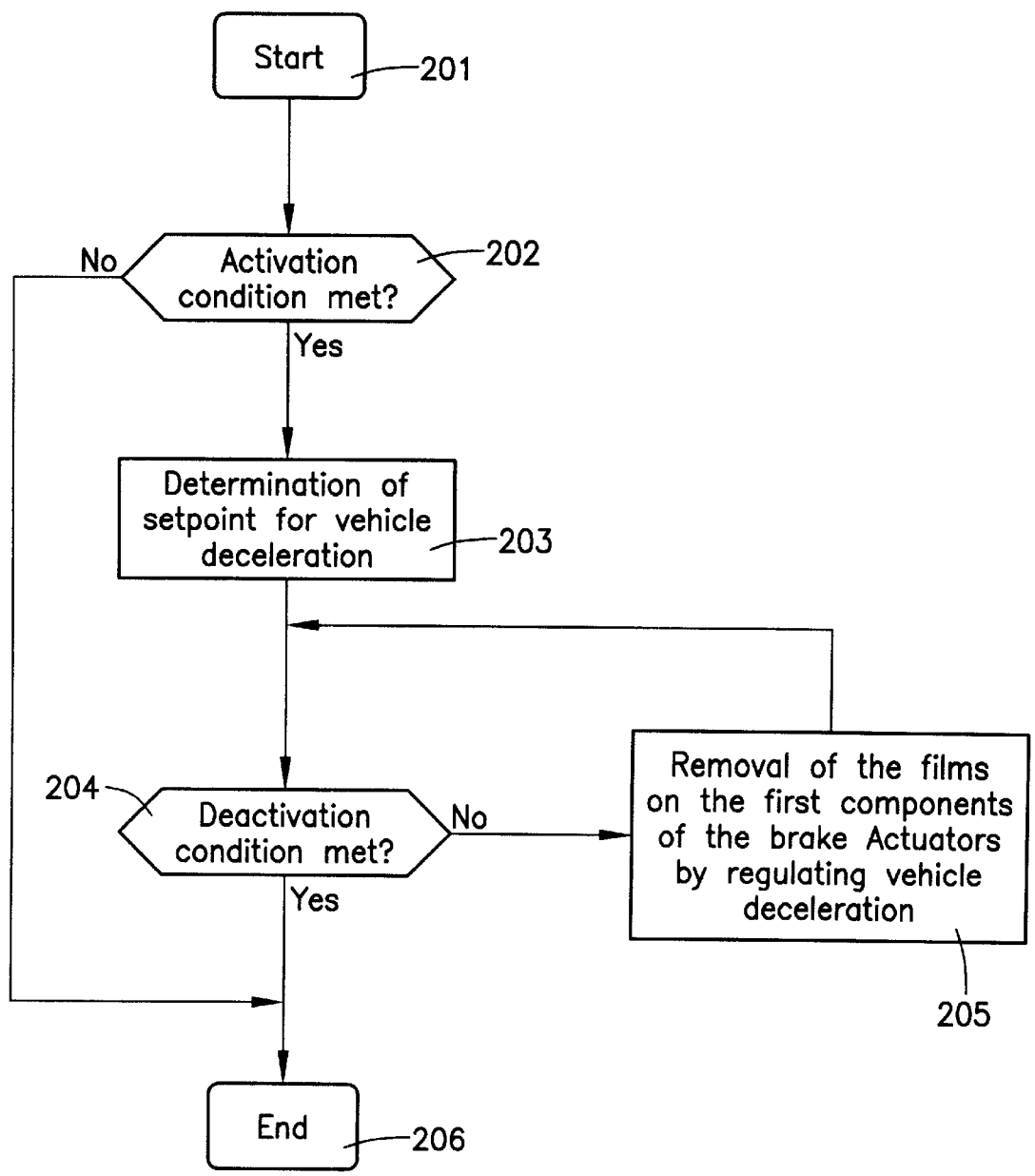
FIG. 2 shows with a flow chart of the sequence in the method according to the present invention.

In the following, reference is made to FIG. 2. The method according to the present invention begins with step 201. Initialization is performed in this step, where at least quantities FAB and verz are initialized. In the present case, a value of 0 is assigned to each quantity. Step 201 is followed by step 202 where a check determines whether the activation condition is met. As shown in conjunction with FIG. 1, this check is performed in block 109. The activation condition is met when:

quantity FFp describing the operation of the accelerator pedal indicates that the accelerator pedal is not being operated, and/or quantity FBp describing operation of the brake pedal indicates that the brake pedal is not being operated, and/or a velocity quantity describing the velocity of the vehicle is greater than a respective threshold value, and/or a quantity FABE representing operation of the brake actuators independently of the driver indicates that there is no operation of the brake actuators independently of the driver, and/or a quantity FSW representing operation of the windshield wiper indicates that the windshield wiper is being operated, or if a sensor for detecting wetness indicates that there is wetness.

If it is found in step 202 that the activation condition is met, then a step 203 is carried out. At the same time, quantity FAB in FIG. 1 is assigned a value of 1.

However, if it is found in step 202 that the activation condition is not met, then following step 202, a step 206 is carried out, terminating the procedure. The value of quantity FAB remains unchanged at 0.

In step 203, the setpoint for the vehicle deceleration is determined. This is done as described in conjunction with block 109. Step 203 is followed by a step 204 where a check determines whether the deactivation condition is met. This check is performed in block 109.

The deactivation condition is met when the period of time during which the brake actuators are controlled to remove the films is greater than a preset time value, and/or a quantity FFp describing operation of the accelerator pedal indicates that the accelerator pedal is being operated, and/or a quantity FBp describing operation of the brake pedal indicates that the brake pedal is being operated, and/or a velocity quantity describing the velocity of the vehicle is below a respective threshold value, and/or quantity FABE representing operation of the brake actuators independently of the driver indicates that the brake actuators are being operated independently of the driver.

If it is found in step 204 that the deactivation condition is not met, then a step 205 is carried out after step 204. In this step, the films on the first components of the brake actuators are removed by controlling the vehicle deceleration. This is done as described in conjunction with block 108, i.e., the actual value of the vehicle deceleration is compared with the setpoint and quantity verz is determined and converted in controller means 110 to control signals aij for operation of the brake actuators.

Then step 204 is carried out again following step 205. The setpoint remains unchanged while vehicle deceleration is being controlled. On reaching the setpoint, further pressure modulation may be suppressed for comfort reasons until the deactivation condition is met.

However, if it is found in step 204 that the deactivation condition is not met, then step 206 is carried out after step 204. Thus, the removal of the films from the first components of the brake actuators is terminated. In this connection, quantity FAB is reset at a value of 0 and quantity verz is assigned a value of 0.

Figure 3:
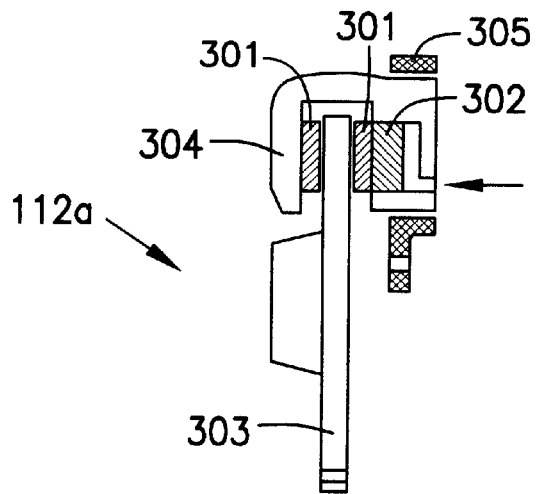
FIG. 3 illustrates a first brake actuator according to the present invention.

FIG. 3 is discussed below. The caliper of this disk brake is designed as a floating caliper. Disk brake 112a has the following individual parts: a first component 303 which is the brake disk, second components 301, which are the brake linings, and also a piston 302, a housing 304 and a carrier 305. The illustration showing a disk brake whose caliper is designed as a floating caliper should not restrict the scope of the present invention in any way. The method according to the present invention can also be used with disk brakes in which the caliper is designed as a sliding caliper. With the help of the method according to the present invention, films on brake disk 303 are removed by applying brake linings 307.

Figure 4:
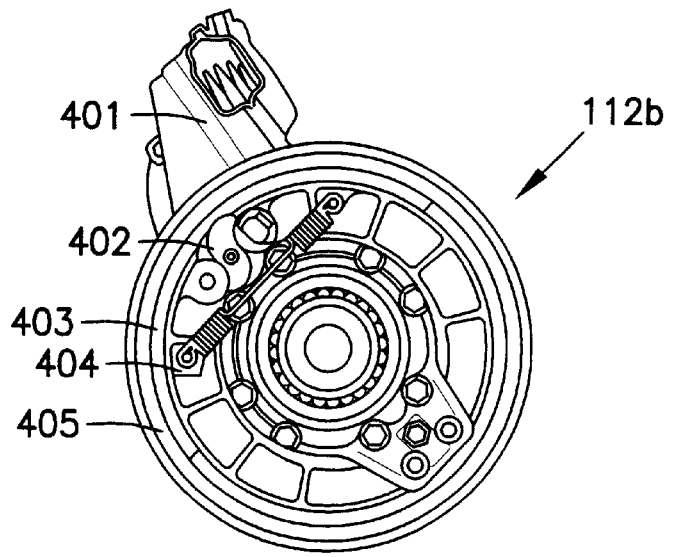
FIG. 4 illustrates a second brake actuator according to the present invention.

FIG. 4 shows a drum brake designed as a simplex drum brake having S cams as the brake actuator. The illustration showing this specific embodiment should not represent a restriction in any form. The method according to the present invention can also be used with simplex drum brakes having pivoted shoes or a split wedge or with twin drum brakes.

Drum brake 112b illustrated in FIG. 4 has a brake drum as first component 405. As second component 403 it has brake shoes. Furthermore, it includes a diaphragm cylinder 401, an S cam 402, and a restoring spring 404. With the method according to the present invention, films on the inside of the brake drum are removed by applying the brake shoes.

For more details regarding the design and operation of disk brakes or drum brakes, reference is made to the publication "Kraftfahrtechnisches Taschenbuch" [Automotive Handbook] ISBN-3-18419114-1, 21$^{st}$ edition, pages 594 through 645.

Slip-controlled brake systems do not usually have pressure sensors provided for each wheel brake cylinder for determining the brake pressure prevailing in the respective wheel brake cylinder, so in the method according to the present invention, removal of the films is implemented by controlling the vehicle deceleration. However, if the slip-controlled brake system has pressure sensors assigned to the wheel brake cylinders, the brake pressure can be adjusted directly by controlling the brake pressure to remove the films. The following procedure is suggested in this regard. First, the period of time in which the vehicle brakes are no longer being operated is determined. Second, the speed of the windshield wiper and the vehicle velocity are analyzed as indicators. If it is found that the vehicle velocity is greater than a respective threshold, and if the windshield wiper is operating at a high speed and the brakes of the vehicle have not been operated for a predetermined period of time or a predetermined driving distance, then a braking operation with a metered force is implemented, the braking force being of a magnitude such that the brake disks are freed of a water film. To compensate for the possible loss of velocity, it is proposed that the engine torque be increased by increasing the amount of fuel supplied. The metered braking force is adjusted by regulating the brake pressure.

In conclusion, it should be pointed out that the type of embodiment selected in the description as well as the illustration chosen for the figures should not have any restrictive effect on the present invention.

What is claimed is:

1. A method of ensuring a braking effect of brake actuators arranged in a vehicle, each brake actuator including at least one first component and second components for producing the braking effect, the method comprising:

removing films on the at least one first component which would interfere with the braking effect;

determining whether an acitivation condition is met, taking into account a quantity describing an operation of an accelerator pedal; and if the activation condition is met:

activating the brake actuators to remove the films; and applying the second components to the at least one first component to enable a vehicle deceleration to be set so that a driver perceives at most little deceleration.

2. The method according to claim 1, wherein the brake actuators are one of the following:

a) disk brakes, each disk brake having a brake disk as the at least one first component and a brake lining as the second component; and b) drum brakes, each drum brake having a brake drum as the at least one first component and brake shoes as the second components.

3. The method according to claim 1, further comprising:

determining a setpoint for the vehicle deceleration as soon as the activation condition is met; and regulating the vehicle deceleration as a function of the setpoint at least by an operation of the brake actuators;

wherein the films on the at least one first component is removed by the operation of the brake actuators.

4. The method according to claim 3, further comprising:

determining a deceleration quantity describing a deceleration of the vehicle as a function of wheel speed quantities; and determining an offset;

wherein the setpoint for the vehicle deceleration is determined as a function of the value of the deceleration quantity prevailing at a time when the activation condition is met, and the offset is determined in such a way that an absolute value of the setpoint is greater than an absolute value of the deceleration quantity.

5. The method according to claim 4, wherein the offset is one of a fixedly predetermined value and a value obtained by weighting a value of the deceleration quantity prevailing at the time when the activation condition is met with a predetermined factor.

6. The method according to claim 1, wherein at least one individual condition is checked in each of successive points in time, and the activation condition is met for during a point in time if the minimum of one individual condition is met at this time.

7. The method according to claim 6, further comprising:
selecting at least a next point in time independently if one of the following is true:
the brake actuators are operated between two successive points in time, by one of a driver or independently of the driver; and
the brake actuators are controlled in a control action to remove the films;
wherein the selection is independent of the operation and the control action, and following points in time are based on the operation and the control action, there being a uniform predetermined interval between each of the successive points in time.

8. The method according to claim 6, wherein there is a uniform predetermined interval between each of the successive points in time, and if one of the following is true:
a) the brake actuators are operated between two successive points in time, by the one of the driver and independently of the driver; and
b) the brake actuators are controlled to remove the films;
then a next point in time follows one of directly and indirectly after one of the operation and the control action, and the following points in time are based on one of the operation and the control action.

9. The method according to claim 7, further comprising one of:
modifying the predetermined interval as a function of a temperature quantity describing the outside temperature, the interval being smaller at lower temperatures than at high temperatures; and
modifying the predetermined interval as a function of a quantity describing the operation of a windshield wiper, the interval being smaller as the speed of the windshield wiper is greater.

10. The method according to claim 1, wherein the activation condition is met and thus removal of the films is necessary when at least one of the following occurs:
a quantity describing the operation of the accelerator pedal indicates that the accelerator pedal is not being operated;
a quantity describing an operation of a brake pedal indicates that the brake pedal is not being operated;
a velocity quantity describing a velocity of the vehicle is greater than a respective threshold value;
a quantity representing an operation of the brake actuators independently of a driver indicates that the brake actuators are not being operated independently of the driver; and
one of
a) a quantity representing an operation of windshield wipers indicates that the windshield wipers are being operated; and
b) a sensor for detecting wetness indicates a presence of wetness.

11. The method according to claim 1, further comprising:
terminating the activation of the brake actuators for removing the films is when a deactivation condition is met, the deactivation condition being met when one of the following occurs:
a period of time during which the brake actuators are controlled to remove the films is greater than a preset time value;
a quantity describing an operation of the accelerator pedal indicates that the accelerator pedal is being operated;
a quantity describing an operation of a brake pedal indicates that the brake pedal is being operated;
a velocity quantity describing a velocity of the vehicle is below a respective threshold value; and
a quantity representing an operation of the brake actuators independently of a driver indicates that the brake actuators are being operated independently of the driver.

12. The method according to claim 10, further comprising:
analyzing a temperature quantity describing an outside temperature as part of the activation condition.

13. The method according to claim 12, wherein the activation condition is met when the temperature quantity is lower than a predetermined temperature value.

14. The method according to claim 1, wherein at least the brake actuators on a front axle of the vehicle are operated, and at least films on wheels of the front axle are removed.

15. A device for ensuring a braking effect in a vehicle, comprising:
a control unit, the control unit determining whether an activation condition is met, taking into account a quantity describing an operation of an accelerator pedal; and
brake actuators situated in the vehicle, the brake actuators including at least one first component and second components for producing the braking effect, the brake actuators being activated to remove films on the at least one first component when the activation condition is met, the second components being applied to the at least one first component to enable a vehicle deceleration to be set so that a driver perceives at most little deceleration.

* * * * *